(12) United States Patent
Wedekind

(10) Patent No.: US 8,201,962 B2
(45) Date of Patent: Jun. 19, 2012

(54) RECESSED DOWNLIGHT FIXTURE FRAME ASSEMBLY

(75) Inventor: Robert Wedekind, Riverside, RI (US)

(73) Assignee: Genlyte Thomas Group LLC, Louisville, KY (US)

( * ) Notice: Subject to any disclaimer, the term of this patent is extended or adjusted under 35 U.S.C. 154(b) by 407 days.

(21) Appl. No.: 12/046,019

(22) Filed: Mar. 11, 2008

(65) Prior Publication Data

US 2009/0231861 A1    Sep. 17, 2009

(51) Int. Cl.
*F21S 8/00*    (2006.01)
(52) U.S. Cl. .................................. 362/150; 248/343
(58) Field of Classification Search .................. 362/150, 362/148, 147, 145; 248/342, 343, 200.1, 248/906
See application file for complete search history.

(56) References Cited

U.S. PATENT DOCUMENTS

| | | |
|---|---|---|
| 506,388 A | 10/1893 | Clark |
| 612,489 A | 10/1898 | Dean |
| 1,264,015 A | 4/1918 | Cochrane |
| 1,704,990 A | 3/1929 | Peirce |
| 1,878,084 A | 9/1932 | Winkler |
| 2,000,241 A | 5/1935 | Mangin |
| 2,331,498 A | 10/1943 | Otto |
| 2,518,936 A | 8/1950 | Roberts |
| 2,541,828 A | 2/1951 | Peck |
| 2,602,881 A | 7/1952 | Pryne |
| 2,676,849 A | 4/1954 | Houck et al. |
| 2,691,541 A | 10/1954 | Benedek |
| 2,716,185 A | 8/1955 | Burliuk et al. |
| 2,719,374 A | 10/1955 | Paione |
| 2,736,528 A | 2/1956 | Brock |
| 2,747,695 A | 4/1956 | Schockett |
| 2,757,818 A | 8/1956 | Chamberlain |
| 2,787,702 A | 4/1957 | Oster et al. |
| 2,802,933 A | 8/1957 | Broadwin |
| 2,842,281 A | 7/1958 | Chisholm |
| 2,844,245 A | 7/1958 | Gruber et al. |
| 2,863,990 A | 12/1958 | Wince |
| 2,965,348 A | 12/1960 | Gerstel et al. |
| 3,003,735 A | 10/1961 | Havener |
| 3,037,682 A | 6/1962 | Daubert |
| 3,057,993 A | 10/1962 | Gellert |
| 3,061,258 A | 10/1962 | Grenier |
| 3,082,023 A | 3/1963 | Rudolph et al. |
| 3,100,642 A | 8/1963 | Goldstein |
| 3,118,621 A | 1/1964 | Bailey |
| 3,130,949 A | 4/1964 | Erhardt et al. |
| 3,158,329 A | 11/1964 | Wince |
| 3,182,187 A | 5/1965 | Gellert |
| 3,281,522 A | 10/1966 | Anisfield |
| 3,313,931 A | 4/1967 | Klugman |
| 3,316,399 A | 4/1967 | Totten |
| 3,374,979 A | 3/1968 | Coldren et al. |
| 3,381,123 A | 4/1968 | Docimo |
| 3,420,995 A | 1/1969 | Dunckel |
| 3,422,261 A | 1/1969 | McGinty et al. |
| 3,495,024 A | 2/1970 | Bowman |
| 3,589,660 A | 6/1971 | Dunckel |
| 3,597,889 A | 8/1971 | Nigro |
| 3,601,862 A | 8/1971 | Hargadon |

(Continued)

*Primary Examiner* — Julie Shallenberger

(57) ABSTRACT

A recessed fixture frame mounting device comprises a first hanger bar connected to a first joist, a second hanger bar connected to a second joist, a recessed can light and junction box connected to the first and second hanger bars, the recessed can and the junction box movable about an axis extending between the first and second joists.

11 Claims, 19 Drawing Sheets

U.S. PATENT DOCUMENTS

| | | | |
|---|---|---|---|
| 3,683,173 A | 8/1972 | Guth, Jr. | |
| 3,700,885 A | 10/1972 | Bobrick | |
| 3,743,228 A | 7/1973 | Drab | |
| 3,749,873 A | 7/1973 | Harper et al. | |
| 3,755,667 A | 8/1973 | Price | |
| 3,778,609 A | 12/1973 | Liberman | |
| 3,780,973 A | 12/1973 | Dalton, Jr. | |
| 3,783,176 A | 1/1974 | Lund et al. | |
| 3,801,815 A | 4/1974 | Docimo | |
| 3,833,113 A | 9/1974 | Osier | |
| 3,872,296 A | 3/1975 | Cohen et al. | |
| 4,000,406 A | 12/1976 | Bhavsar | |
| 4,041,657 A | 8/1977 | Schuplin | |
| 4,096,964 A | 6/1978 | Glick | |
| 4,118,760 A | 10/1978 | Cohon | |
| 4,129,948 A | 12/1978 | Hatter et al. | |
| 4,161,019 A | 7/1979 | Mulvey | |
| 4,191,352 A | 3/1980 | Schuplin | |
| 4,209,103 A | 6/1980 | Glovier | |
| 4,230,297 A | 10/1980 | Comer et al. | |
| 4,250,540 A | 2/1981 | Kristofek | |
| 4,274,615 A | 6/1981 | Chan et al. | |
| 4,277,641 A | 7/1981 | Bauer et al. | |
| 4,293,895 A | 10/1981 | Kristofek | |
| 4,307,672 A | 12/1981 | Shikimi | |
| 4,313,154 A | 1/1982 | Capostagno et al. | |
| 4,327,403 A | 4/1982 | Capostagno et al. | |
| 4,335,511 A | 6/1982 | Bowling | |
| 4,336,575 A * | 6/1982 | Gilman | 362/147 |
| 4,345,381 A | 8/1982 | Brislin | |
| 4,388,677 A | 6/1983 | Druffel | |
| 4,388,890 A | 6/1983 | Wester et al. | |
| 4,400,766 A | 8/1983 | Munson | |
| 4,408,262 A | 10/1983 | Kusmer | |
| 4,419,717 A | 12/1983 | Price et al. | |
| 4,424,554 A | 1/1984 | Woloski et al. | |
| 4,431,151 A | 2/1984 | Schonasky | |
| 4,449,687 A | 5/1984 | Karaktin | |
| 4,450,512 A | 5/1984 | Kristofek | |
| 4,459,429 A | 7/1984 | Docimo | |
| 4,471,416 A | 9/1984 | Druffel | |
| 4,482,940 A | 11/1984 | Brandherm | |
| 4,497,014 A | 1/1985 | Woloski et al. | |
| 4,503,489 A | 3/1985 | Duerr et al. | |
| 4,522,541 A | 6/1985 | Bidwell | |
| 4,582,737 A | 4/1986 | Torgerson et al. | |
| 4,591,658 A | 5/1986 | Bauer et al. | |
| 4,605,816 A | 8/1986 | Jorgensen et al. | |
| 4,646,212 A | 2/1987 | Florence | |
| 4,684,223 A | 8/1987 | Ikemori et al. | |
| 4,705,255 A | 11/1987 | Reed, Jr. | |
| 4,713,916 A | 12/1987 | Brooks, Jr. | |
| 4,729,080 A | 3/1988 | Fremont et al. | |
| 4,733,336 A | 3/1988 | Skogler et al. | |
| 4,733,339 A | 3/1988 | Kelsall | |
| 4,751,624 A | 6/1988 | Russo et al. | |
| 4,754,377 A | 6/1988 | Wenman | |
| 4,764,851 A | 8/1988 | Hartmann | |
| 4,792,191 A | 12/1988 | Farmer | |
| 4,803,603 A | 2/1989 | Carson | |
| 4,829,410 A | 5/1989 | Patel | |
| 4,894,759 A | 1/1990 | Siems | |
| 4,910,651 A | 3/1990 | Montanez | |
| 4,972,339 A | 11/1990 | Gabrius | |
| 4,989,334 A | 2/1991 | DuBose, Jr. | |
| 5,014,853 A | 5/1991 | Crockett | |
| 5,031,084 A | 7/1991 | Russo et al. | |
| 5,045,985 A | 9/1991 | Russo et al. | |
| 5,057,979 A | 10/1991 | Carson et al. | |
| 5,068,772 A | 11/1991 | Shapiro et al. | |
| 5,075,831 A | 12/1991 | Stinger et al. | |
| 5,077,650 A | 12/1991 | Cestari | |
| 5,094,359 A | 3/1992 | DeMars et al. | |
| 5,103,762 A | 4/1992 | Long et al. | |
| 5,110,038 A | 5/1992 | Pantisano et al. | |
| 5,124,901 A | 6/1992 | Sojka et al. | |
| 5,130,914 A | 7/1992 | Bengochea | |
| 5,186,319 A | 2/1993 | Ting | |
| 5,222,800 A | 6/1993 | Chan et al. | |
| 5,236,157 A | 8/1993 | Reggiani | |
| 5,291,381 A | 3/1994 | Price | |
| 5,314,148 A | 5/1994 | Jones | |
| 5,373,431 A | 12/1994 | Hayman et al. | |
| 5,374,812 A | 12/1994 | Chan et al. | |
| 5,377,088 A | 12/1994 | Lecluze | |
| 5,410,462 A | 4/1995 | Wolfe | |
| 5,420,775 A | 5/1995 | Kusmer | |
| 5,452,193 A | 9/1995 | Hinnefeld et al. | |
| 5,452,816 A | 9/1995 | Chan et al. | |
| 5,465,199 A | 11/1995 | Bray et al. | |
| 5,538,214 A | 7/1996 | Sinila | |
| 5,562,343 A | 10/1996 | Chan et al. | |
| 5,564,815 A | 10/1996 | Littman et al. | |
| 5,588,737 A | 12/1996 | Kusmer | |
| 5,597,234 A | 1/1997 | Winkelhake | |
| 5,609,474 A | 3/1997 | Ohno | |
| 5,630,663 A | 5/1997 | Ling et al. | |
| 5,669,324 A | 9/1997 | Muir, III | |
| 5,678,794 A | 10/1997 | Kump | |
| 5,690,423 A | 11/1997 | Hentz et al. | |
| 5,707,143 A | 1/1998 | Hentz | |
| 5,725,302 A | 3/1998 | Sirkin | |
| 5,746,507 A | 5/1998 | Lee | |
| 5,758,959 A | 6/1998 | Sieczkowski | |
| 5,803,585 A | 9/1998 | Littman et al. | |
| 5,836,678 A | 11/1998 | Wright et al. | |
| 5,857,766 A | 1/1999 | Sieczkowski | |
| 5,951,151 A | 9/1999 | Doubeck et al. | |
| 5,957,572 A | 9/1999 | Wedekind et al. | |
| 5,957,573 A * | 9/1999 | Wedekind et al. | 362/365 |
| 5,957,574 A | 9/1999 | Hentz et al. | |
| 6,000,818 A | 12/1999 | Caluori | |
| 6,062,704 A | 5/2000 | Holder | |
| 6,095,669 A | 8/2000 | Cho | |
| 6,095,671 A | 8/2000 | Hutain | |
| 6,098,825 A | 8/2000 | Kohnen | |
| 6,142,439 A | 11/2000 | Aramaki | |
| 6,145,798 A | 11/2000 | Janisse et al. | |
| 6,272,794 B1 | 8/2001 | Rippel et al. | |
| 6,343,873 B1 | 2/2002 | Eberhard | |
| 6,369,326 B1 | 4/2002 | Rippel et al. | |
| 6,402,112 B1 | 6/2002 | Thomas et al. | |
| 6,421,904 B1 | 7/2002 | Wedekind et al. | |
| 6,461,016 B1 * | 10/2002 | Jamison et al. | 362/147 |
| 6,554,457 B1 | 4/2003 | Platt | |
| 6,582,106 B2 | 6/2003 | Jamison | |
| 6,632,006 B1 | 10/2003 | Rippel et al. | |
| 7,118,254 B2 | 10/2006 | Czech | |
| 7,297,870 B1 | 11/2007 | Sartini | |
| 2003/0115767 A1 | 6/2003 | Wedekind et al. | |
| 2007/0131827 A1 * | 6/2007 | Nevers et al. | 248/201 |

* cited by examiner

RECESSED DOWNLIGHT FIXTURE FRAME ASSEMBLY

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a recessed downlight fixture and more specifically a moveable assembly for the recessed downlight fixture.

2. Description of the Related Art

Recessed enclosures, such as, downlight fixtures have become increasingly popular for residential and commercial use. One reason for the increased popularity is that the recessed downlight fixtures meet a wide range of interior lighting requirements while also being aesthetically pleasing. Recessed lighting fixtures or downlights provide lighting for an area and are aesthetically pleasing due in part to the unobtrusive nature of the fixtures themselves which are typically recessed within the ceiling. Further, recessed downlight fixtures may be installed in new constructions as well as existing ceilings and therefore are valued by installers. Typically, ceiling-mounted recessed downlight fixtures comprise a frame-in kit with means for securing the frame to structural supports of the ceiling. For installation, the frame of the light fixture may include holes or brackets through which fasteners are positioned to attach the fixture to the supports.

A support system is often employed to suspend a recessed lighting fixture assembly between adjacent supports. Conventional downlights may be installed between ceiling joists or from suspended ceiling grids. However, once positioned between ceiling support structures such as ceiling joists or suspended ceiling grids, completion of wiring is difficult due to the proximity of the ceiling support structures to the junction box. It is preferable that a fixture frame be configured to move from a downward installation position to an installed operating position.

Given the foregoing, it will be appreciated that a fixture frame assembly is needed which provides structure to position the junction box beneath the lower edges of the ceiling support structures to allow easy installation of wiring in the junction box and further allow the repositioning of the junction box above the ceiling support structure.

SUMMARY OF THE INVENTION

A recessed fixture frame mounting device comprises a first hanger bar connected to a first joist, a second hanger bar connected to a second joist, a recessed can light and junction box connected to the first and second hanger bars, the recessed can and the junction box movable about an axis extending between the first and second joists. The recessed fixture frame mounting device further comprises a bracket having at least one aperture, the bracket connected to the recessed can. The recessed fixture frame mounting device wherein one of the first hanger bar and the second hanger bar engage one of the first joist and the second joist. The recessed fixture frame mounting device wherein the recessed can and the bracket are pivotable about an axis extending from the first joist to the second joist. The recessed fixture frame mounting device wherein the first hanger bar and the second hanger bar extend perpendicular to the first joist and the second joist. The recessed fixture frame mounting device wherein the first hanger bar and the second hanger bar extend parallel to the first joist and the second joist. The recessed fixture frame mounting device wherein the first hanger bar has first and second ends connected to the first joist and the second hanger bar has first and second ends connected to the second joist. The recessed fixture frame mounting device wherein the recessed can has a longitudinal axis which is parallel to the first and second joists when the recessed can is pivoted downwardly.

A recessed luminaire fixture frame mounting assembly comprises a hanger bar extending between first and second ceiling structures, a bracket pivotally mounted to the hanger bar and connected to a junction box, a recessed lighting can connected to the hanger bar, wherein the junction box is pivotable from a first position above a lowermost edge of the first and second ceiling structures to a second position below the lowermost edge about the hanger bar, wherein the recessed lighting can has a longitudinal axis which is substantially parallel to the joists when the recessed can is pivoted to a downward position.

A recessed fixture frame comprises a first fixture arm and a second fixture arm, at least one frame arm connected to a recessed lighting can and to the first and second fixture arms, the first fixture arm connected to a first joist and the second fixture arm connected to a second joist so that the recessed lighting can is depending from the frame arm and oriented so that a major axis of the recessed lighting can is substantially parallel to the joists in a downwardly disposed position, the frame arm and recessed lighting can being rotatable about an axis extending from the first joist to the second joist from an upwardly disposed position to the downwardly disposed position. The recessed fixture frame wherein the first fixture arm is pivotably connected to the first joist at one end and the second fixture arm pivotably connected to the second joist at an end corresponding to the one end. The recessed fixture frame wherein the first and second fixture arms are connected to the first joist at one end and to the second joist at a second end. The recessed fixture frame wherein the first fixture arm is connected to the first joist at each end and the second end is connected to the second joist at each end. The recessed fixture frame wherein the frame arm comprises a bracket slidably and rotatably disposed on at least one of the first and second fixture arms. The recessed fixture frame wherein the bracket is slidable by an opposed squeezing motion.

A recessed lighting frame comprises a first fixture arm and second fixture arm extending parallel to the joists, a recessed can disposed between the first and second fixture arms, pivot fasteners connecting the first and second fixture arms to first and second ceiling support structures, the pivot fasteners being perpendicular to the first and second ceiling support structures. The recessed lighting frame wherein the first fixture arm is connected at first and second ends to one of the joists. The recessed lighting frame further wherein the recessed can comprises a longitudinal axis which is movable with pivoting movement of the recessed can from a vertical position to a position which is substantially parallel with the joists.

A recessed lighting fixture comprises a first hanger bar connected to a first ceiling support structure, a second hanger bar connected to a second ceiling support structure, a lighting can and junction box assembly connected to the first hanger bar and the second hanger bar, the lighting can having a longitudinal axis, the longitudinal axis moving from a first position substantially perpendicular to longitudinal axes of the first and second ceiling support structures, to a second position substantially parallel to the first and second ceiling support structures.

A recessed lighting fixture comprises a first hanger bar having a first pivotal connection to a first ceiling support structure, a second hanger bar a second pivotal connection to a second ceiling support structure, a pivot axis defined between the first pivotal connection and the second pivotal connection and extending between the first ceiling support structure and the second ceiling support structure, a recessed lighting can connected to the first hanger bar and the second hanger bar, the recessed lighting can having a longitudinal axis which is substantially perpendicular to the pivot axis. The recessed lighting fixture wherein the recessed lighting can is orbitally pivotable about the pivot axis. The recessed lighting fixture wherein the recessed lighting can is movable from a first position below the ceiling support structures to a second position above the ceiling support structures. The recessed lighting fixture wherein the longitudinal axis being substantially parallel to length of the first and second ceiling supports.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
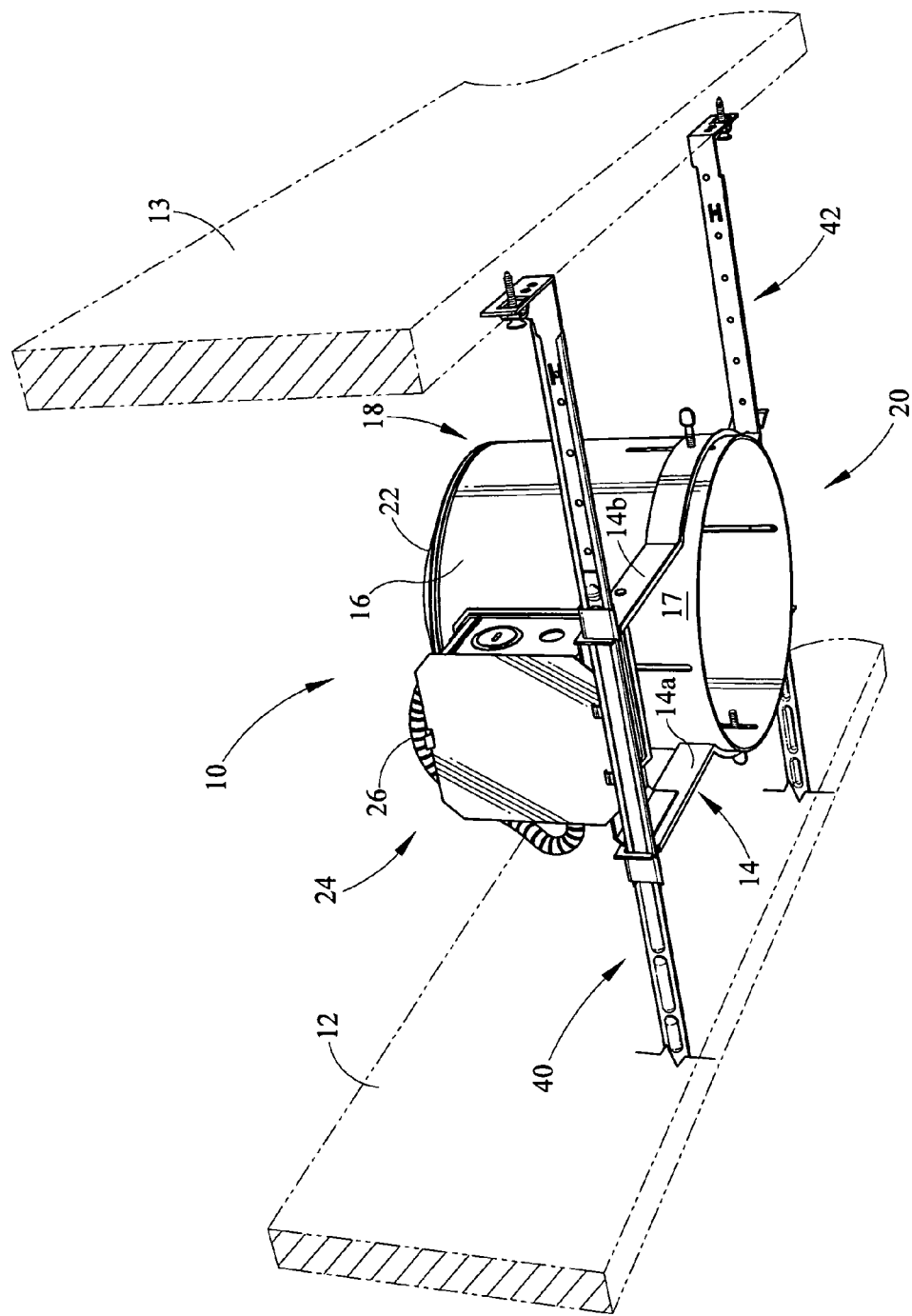
FIG. 1 is a perspective view of recessed lighting fixture frame assembly.
Figure 2:
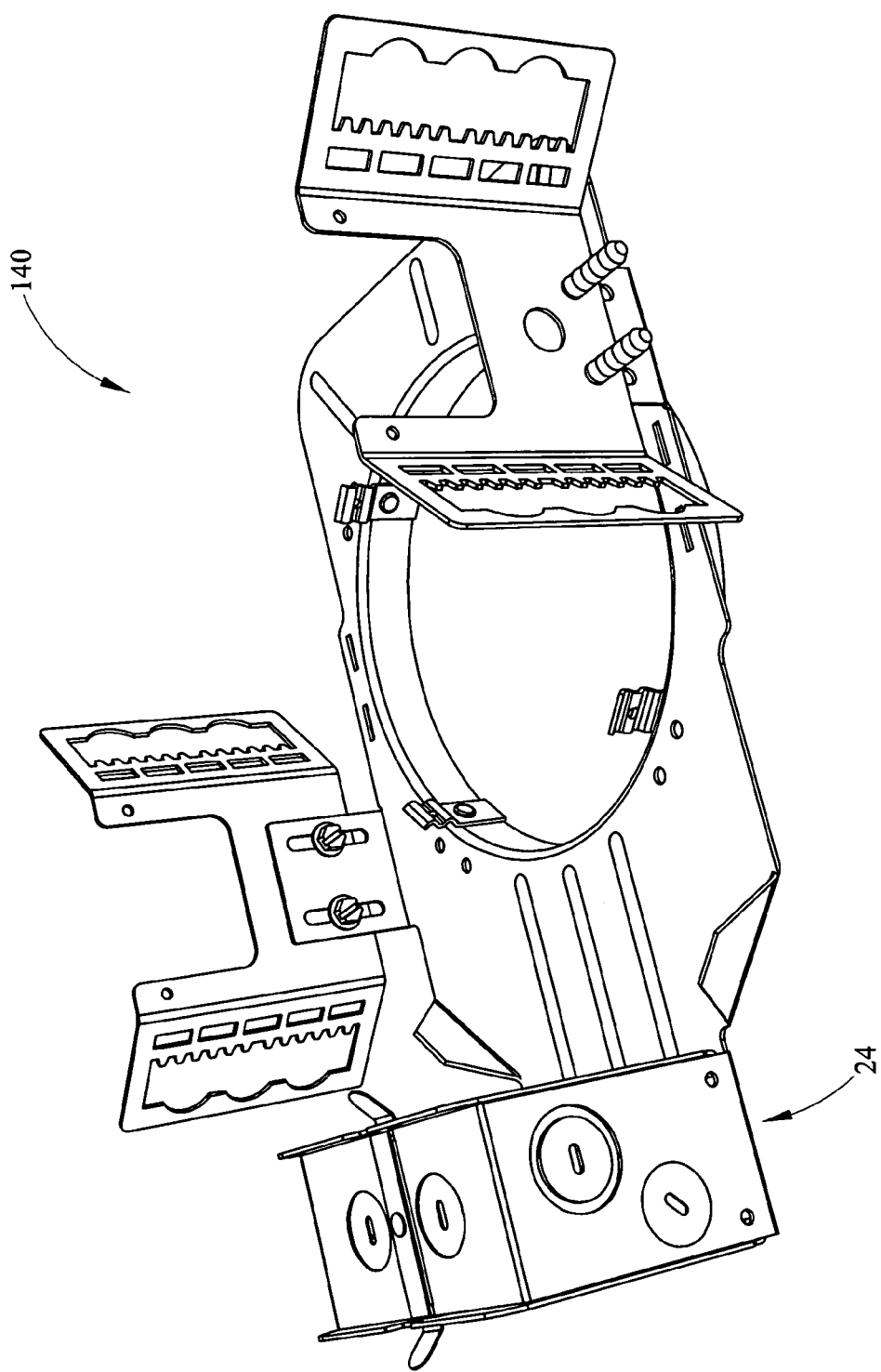
FIG. 2 is a perspective view of an alternative fixture frame.
Figure 3:
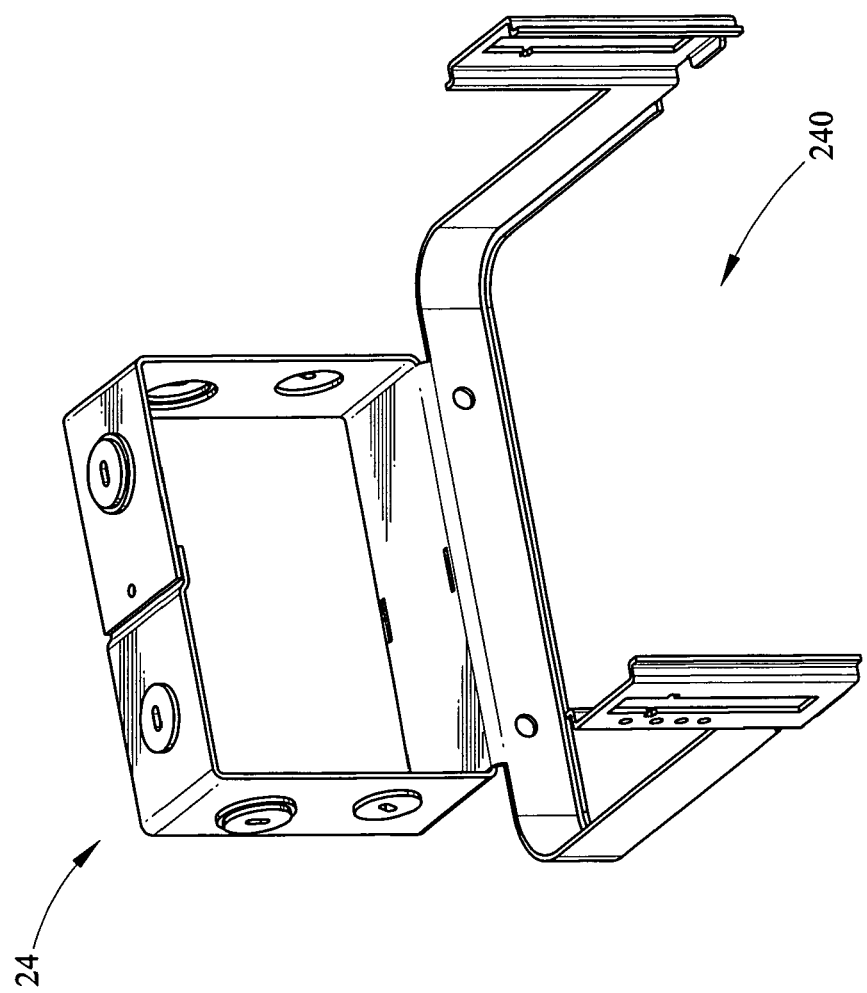
FIG. 3 is a perspective view of an alternative fixture frame arm design.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. For purpose of the present invention, the term hinge may mean one or more parts which allow deployment of the fixture frame or junction box from a lower installation position to an upper installed position, generally between ceiling structures, or vice-versa.

Referring now in detail to the drawings, wherein like numerals indicate like elements throughout the several views, there are shown in FIGS. 1-19 various aspects of a recessed downlight fixture are depicted. Specifically, various embodiments are depicted which allow the fixture frame or junction box to be positioned beneath ceiling structural members for ease of wiring the junction box during installation. The hinge design makes possible the movement of at least the junction box from a lower installation position to an upper installed position or vice versa.

Referring initially to FIG. 1, a recessed lighting assembly 10 is depicted in perspective view and positioned generally above a ceiling surface or structure (not shown). The ceiling structure 12 may be formed of, for example, a fixed ceiling of drywall or plaster, a removable ceiling panel, or other materials known to one of ordinary skill in the art for enclosing a volume defining a room. Hanger bars 40,42 are depicted suspending a fixture frame 14 between ceiling structural members 12,13 such as the ceiling joists depicted, or suspended ceiling grid members. The hanger bars 40,42 are generally adjustable lengthwise to allow installation between varying joist distances or from ceiling grids of various size. The hanger bars 40,42 are depicted having with break lines at one end, where the exemplary biasing elements of FIG. 4 may be connected. Suspended between the hanger bars 40,42 is a fixture frame 14 which may comprise various forms. For example, the fixture frame 14 of FIG. 1, comprises a first strap 14a and a second strap 14b. The straps 14a, 14b comprise a curved portion wherein a corresponding curved surface 17 of the recessed lighting can 16 is received. Alternatively, the fixture frame 14 may comprise various forms, such as frame design 140, shown in FIG. 2 or a frame arm 240 such as that shown in FIG. 3. The recessed lighting assembly 10 further comprises a recessed lighting can or enclosure 16. The can 16 may be formed of various materials such as steel, galvanized steel, aluminum, fiberglass, laminates, composites or other lightweight rigid material for retaining electrical components and elements between the ceiling structural members 12,13 and the hanger bars 40,42. The exemplary recessed lighting can 16 is substantially cylindrical in shape as defined by sidewall 17 with upper and lower ends 18, 20. At the upper end 18 of the recessed lighting can 16 is a closed end top 22 which substantially closes the cylindrical lighting can 16. The closed end top 22 may be attached to the upper end 18 of the recessed lighting can 16 by various means including fasteners such as rivets, screws or fixative or otherwise slidably attached to the upper edge of the can 16 in order to inhibit access of contaminants into the lighting can 16 from above. The closed end top 22 may be frusto-conical in shape or substantially disk like and flat depending on the clearance above the recessed lighting can 16. The closed end top 22 may also be formed of various materials but is preferably formed of the same material as the can 16 to prevent corrosion associated with dissimilar metals.

Interior of the top 22 various electrical components are located for providing illumination. Such components may include a socket cup (not shown) and socket (not shown) which receive a lamp. Various types of lamps may be utilized such as incandescent, fluorescent, compact fluorescent, halogen, quartz and others know to one skilled in the art. If desirable a reflector (not shown) may be utilized within the can 16. In addition, a trim piece (not shown) may be installed at the lower end 20 of the recessed can 16. Such trim may aid in light distribution.

Spaced from the recessed lighting can 16 is a junction box 24 wherein electrical connections may be made between a power source and the recessed lighting assembly 10. The junction box 24 may be formed of various materials but is also preferably formed of a lightweight rigid material. The junction box 24 may further comprise a removable or hingedly attached door providing access to the junction box interior. The junction box 24 may be used to wire various devices including but not limited to the recessed lights, for example fans, security systems, electric roof windows, wall outlets or other such devices requiring strain relief.

Extending between the junction box 24 and the recessed lighting can 16 is a conduit 26. The conduit 26 may be metallic with wiring of various gauge extending therethrough. Within the conduit 26 are a plurality of wires extending between the junction box 24 and the lighting elements within the recessed lighting can 16. The wiring provides control and power to the lighting socket. Alternatively, Romex cable, non-metallic building wire, or other such electric connecting components may be used. A clamp (not shown) may be positioned in or around the junction box 24 to inhibit wire pulling through the conduit 26.

Figure 4:
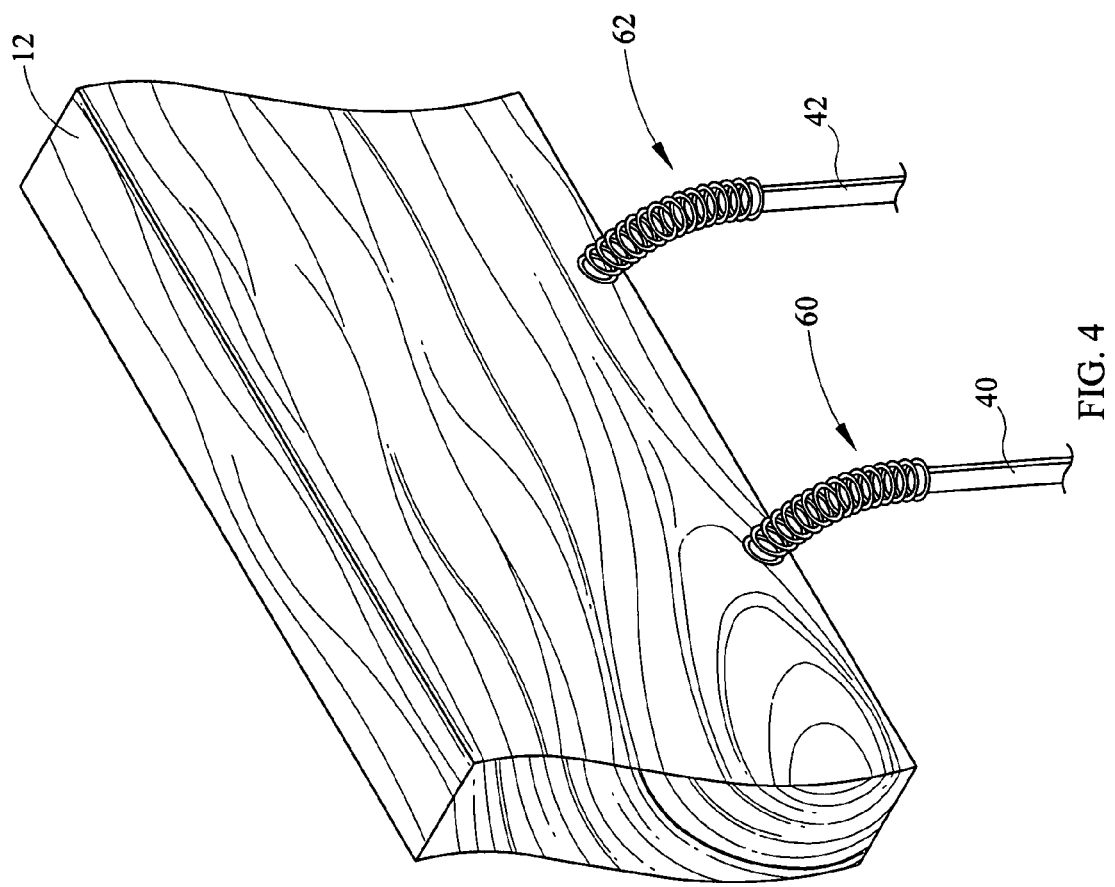
FIG. 4 is a perspective view of a biasing device which allows the fixture frame be disposed in first and second positions for junction box access.

Referring now to FIG. 4, movable ends of the recessed lighting fixture 10 are depicted. Connected to the ceiling structural member 12 and the hanger bars 40,42 are first and second biasing members 60, 62 which allow the fixture frame, for example 14 (FIG. 1), and junction box 24 to be disposed in a lower position for installation and wiring and subsequently moved to an upper operating position between the ceiling structural members 12, 13. The movable ends comprise biasing members 60, 62 which are tensioned to retain the fixture assembly 10 in an upright position, as depicted in FIG. 1. From the upright position, the biasing members 60,62 do not sag so as not interfere with the ceiling structure there below. However, by pulling down on the frame assembly 10 when the frame arms 40, 42 are not connected to the opposing joist 13 (FIG. 1), the tensioned biasing members 60, 62 allow positioning of the frame assembly 10 in a downward orientation so that the junction box 24 may be easily wired during installation. The biasing members 60, 62 may be connected by a fastener, or other means (not shown) known to one skilled in the art, to the joist 12. Further, the biasing members 60, 62 may alternatively be a flat leaf spring or a round bar stock which is tempered of a pre-selected diameter so as to bend when the fixture frame is connected to the biasing members 60,62.

Figure 5:
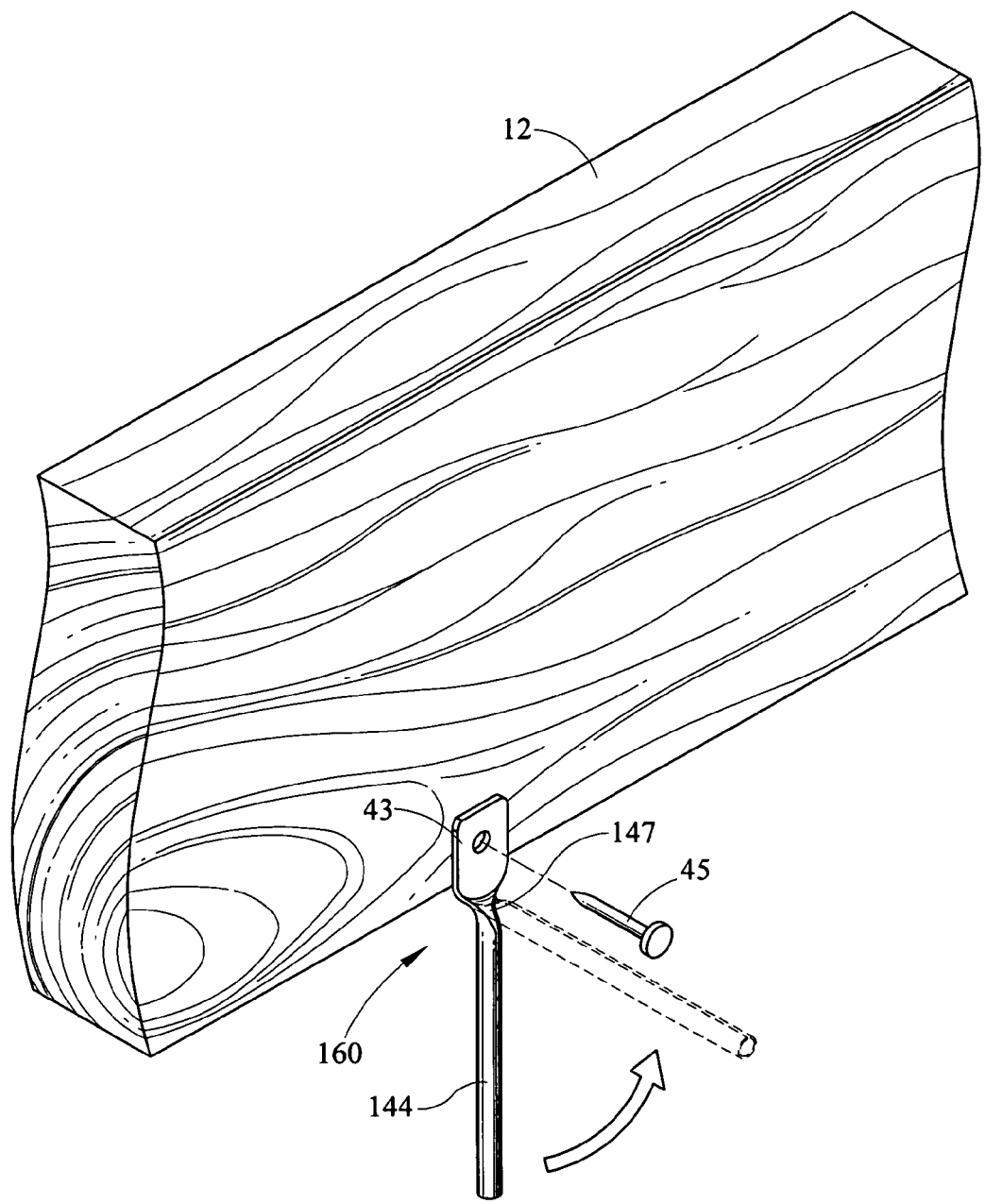
FIG. 5 is a perspective view of a hanger bar which is bendable between first and second positions to ease installation and junction box wiring.
Figure 6:
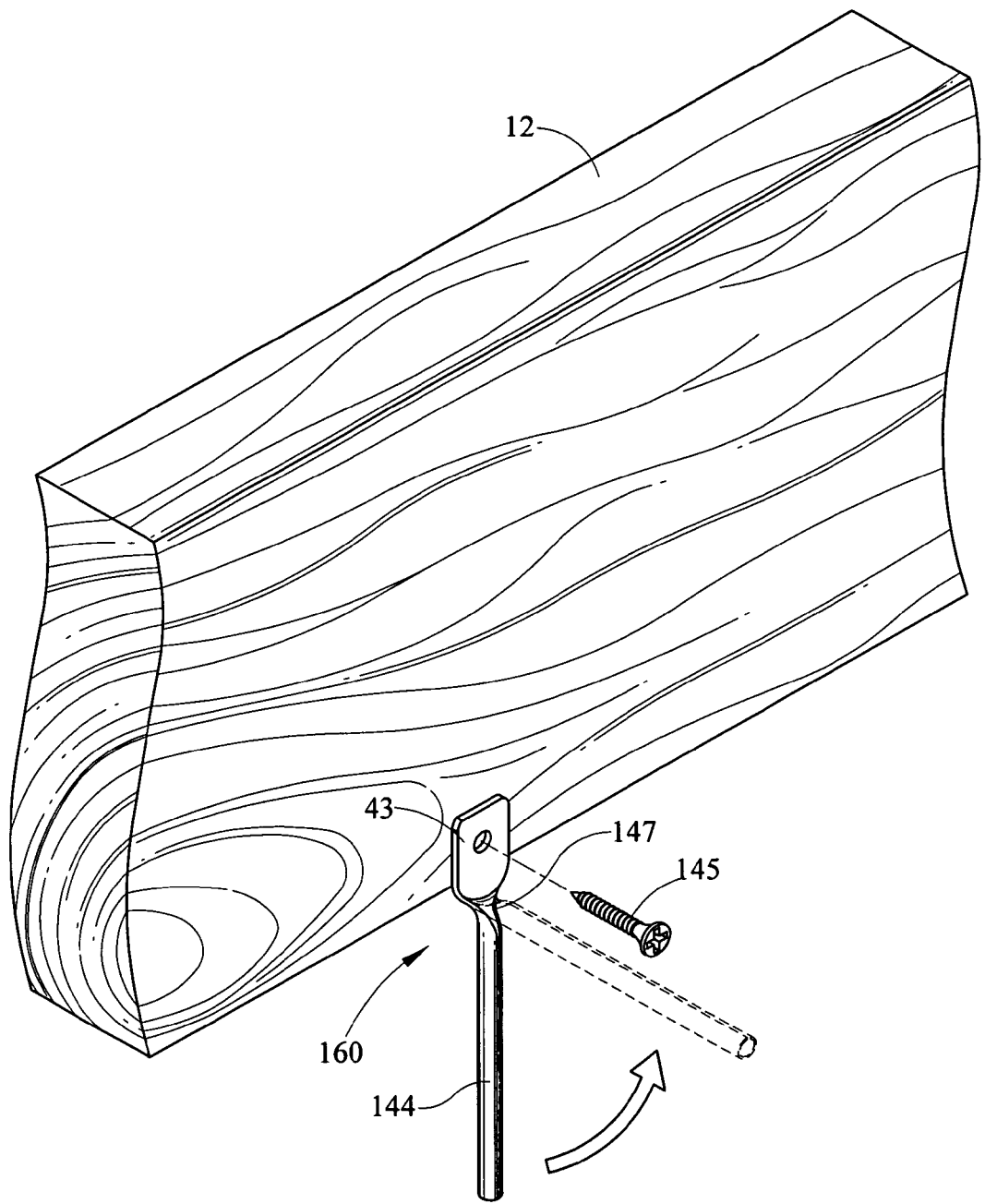
FIG. 6 is a perspective view of the hanger bar of FIG. 5 with an alternative fastener.
Figure 7:
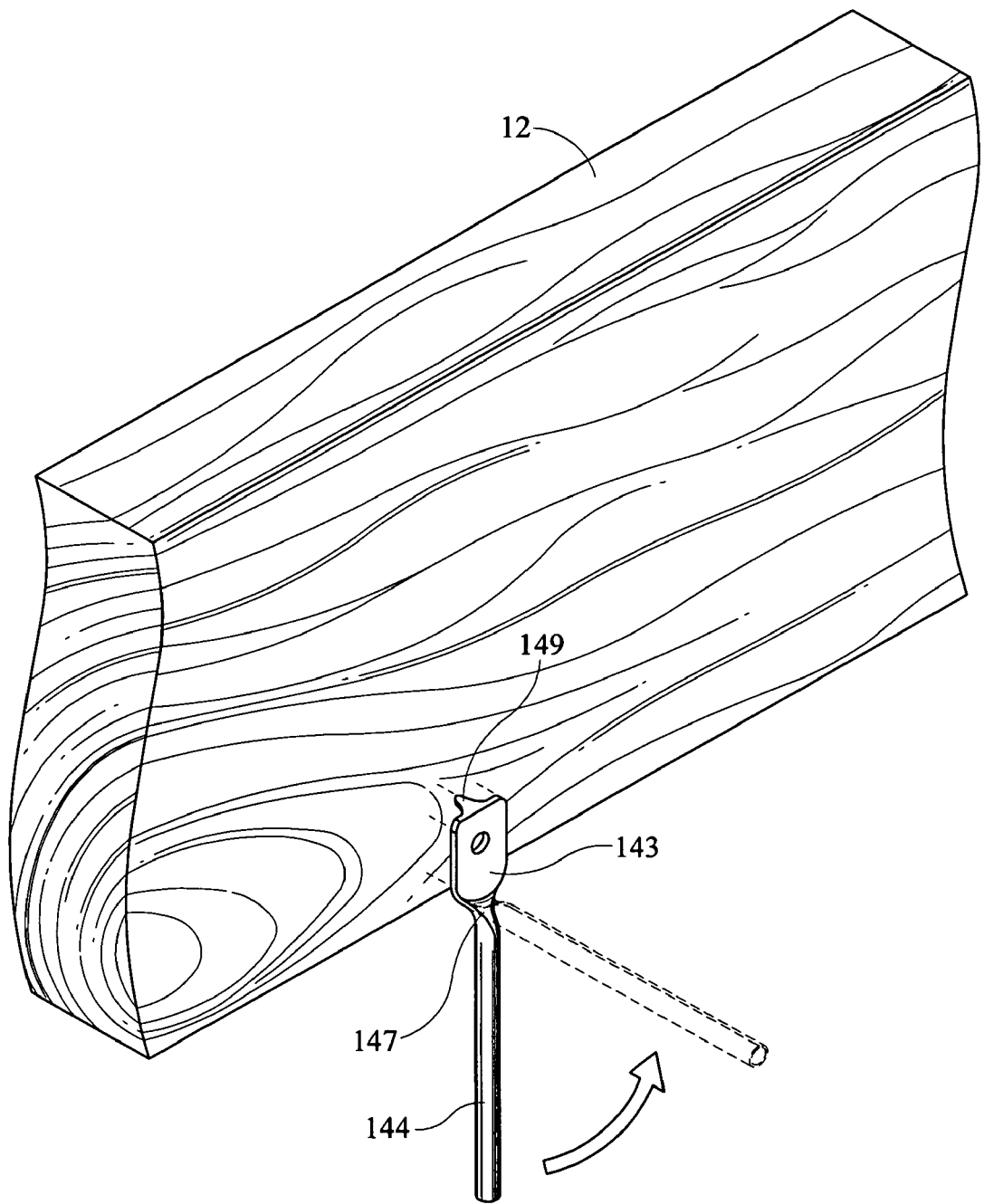
FIG. 7 is a perspective view of an alternative hanger bar of FIG. 5.

Referring now to FIGS. 5-7, an alternative hinge design is depicted for connecting the frame assembly 10 to the joist 12. A hanger bar first portion 144 and a second portion 146 (FIG. 8) have a sliding relationship and may be formed of various complementary geometric cross-sections such as the circular cross-section depicted or the U-shaped channel cross-section shown in FIG. 1. The first arm portion 144 is depicted having a foot 43 which is fastened to joist 12. The foot 43 is substantially rectangular in shape but various shapes may be utilized. Connecting the foot 43 to the first arm portion 144 is a neck 147. The neck area may be pre-stressed to provide the hinge 160 allowing, in one depicted orientation, the first arm 144 to depend from the joist 12 and be folded or bent upwardly to a second orientation once the wiring and junction box installation is complete. The first arm portion 144 is shown in an upward position in broken lines in FIGS. 5-7. FIG. 5 depicts the use of a fastener 45 such as a nail to connect the foot 43 to the joist 12, while, alternatively, FIG. 6 depicts fastener 145 as a screw to fasten the foot 43 to the joist 12. In either embodiment, the foot 43 comprises a fastener aperture and it should be understood that various alternative fasteners may be utilized.

Referring now to FIG. 7, the first arm portion 144 is depicted having an alternative foot 143. The foot 143 comprises an integral tack 149 which is positioned against the joist 12 and hammered into place. The tack 149 retains the foot 143 in position before a fastener is inserted through the foot 143 into the joist 12. Once the tack 149 is hammered into place, a fastener (not shown) may be disposed through the foot 143 to further aid in retaining the foot 143 against the joist 12. The first arm portion 144 further comprises the neck 147, to connect the foot 143, which allows the first arm portion to be bent from a downwardly disposed position for installation to an upward position between the joists 12, 13 (FIG. 1), as previously indicated and depicted in broken line.

Figure 8:
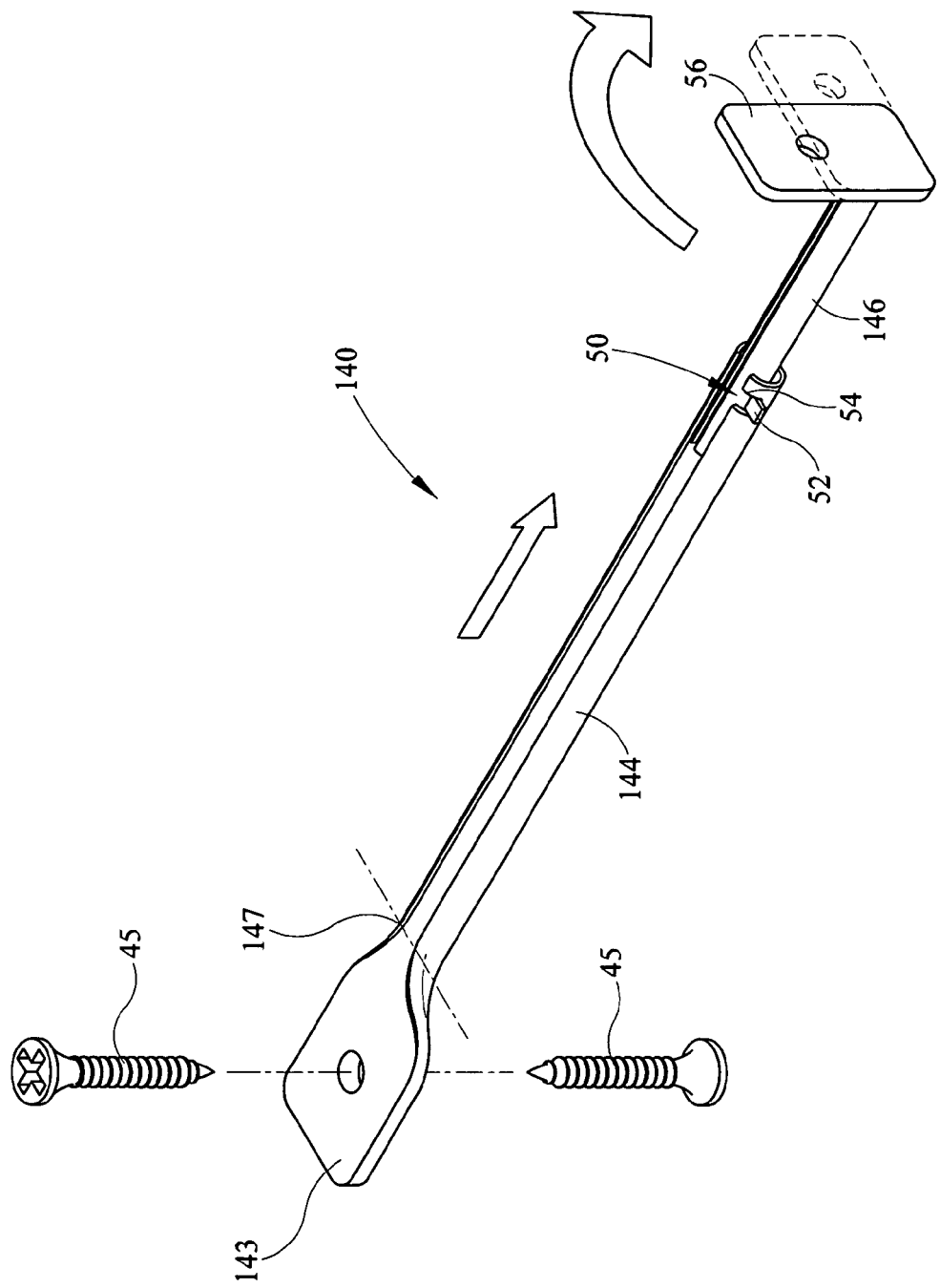
FIG. 8 is a perspective view of an alternative hanger bar design.

Referring now to FIG. 8, the full alternative hanger bar 140 is depicted in perspective view. The first arm portion 144 comprises a first foot 143 connected by a neck 147 to the first arm 144. The first foot 143 is bendable at the neck 147, as depicted in broken line, about a horizontal axis which is substantially perpendicular to the longitudinal axis of the first arm 144. The foot 143 therefore may be connected to a joist 12 through either side by use of a fastener 45 as shown. At the opposite end of the first arm portion 144 is a second arm portion 146 having a circular cross-section which is slidably received within the first arm portion 144. The second arm portion 146 is pivotable about a longitudinal axis which is coaxial with the longitudinal axis of the first arm portion 144 so that a foot 56 may be pivoted between a first position which is substantially upright and shown in solid lines and a second position which is substantially horizontal and shown in broken lines. Extending from the second arm portion 146 is a tab 52. The first arm portion 144 comprises a slot 54 having a width which is at least substantially equivalent to the width of tab 52 so that the tab 52 may be received therein. When the tab 52 is positioned within the slot 54 as shown in FIG. 8, the second arm portion 146 cannot extend or retract through the first arm portion 144. When the tab 52 is rotated out of the slot 54, the second arm portion 146 can extend or retract through the first arm portion 144. When the first foot 143 is vertically disposed the tab 52 is engaged within the slot 54, the second arm portion 146 is inhibited from sliding out of the downwardly directed first arm portion 144 so as not to fall on an installer. Once the first arm portion 144 is bent near the neck 147, the pivotal foot 56 can be rotated so that the tab 52 disengages the slot 54 and the second arm portion 146 may be extended so that the pivotal foot 56 engages the opposed joist 13 (not shown) and connected thereto. One skilled in the art will understand that the slot 54 and tab 52 may be substituted between the first and second arm portions 144,146. Further, the tab and slot 52,54 may comprise multiple complimentary shapes.

Figure 9:
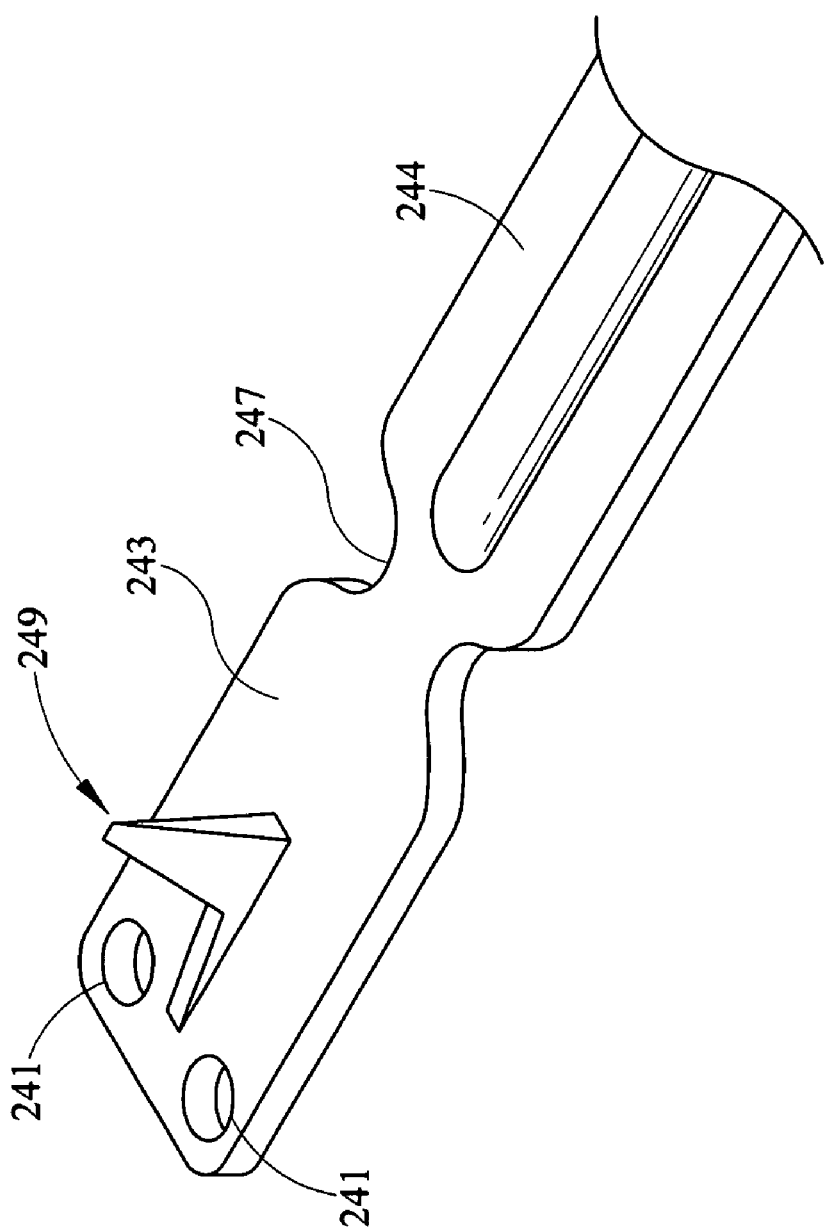
FIG. 9 is a perspective view of a hanger bar with a pivotable foot design.

Referring now to FIG. 9, an alternative foot 243 is depicted having an alternative integral spike 249 thereon. As opposed to the design shown in FIG. 7, the spike or tack 249 extends from a central location on the foot 243 to a point. The foot 243 may be disposed against a surface of the joist 12 (FIG. 1) and hammered so that the tack 249 engages the wood, affixing the foot 243 to the joist 12. The foot 243 further comprises at least one fastening aperture 241 for fastening the foot 243 to the joist 12 as well. The foot 243 is connected to the first arm portion 244 by a neck 247. The neck 247 allows bending of the first arm portion 244 once the foot 243 is connected to the joist.

Figure 10:
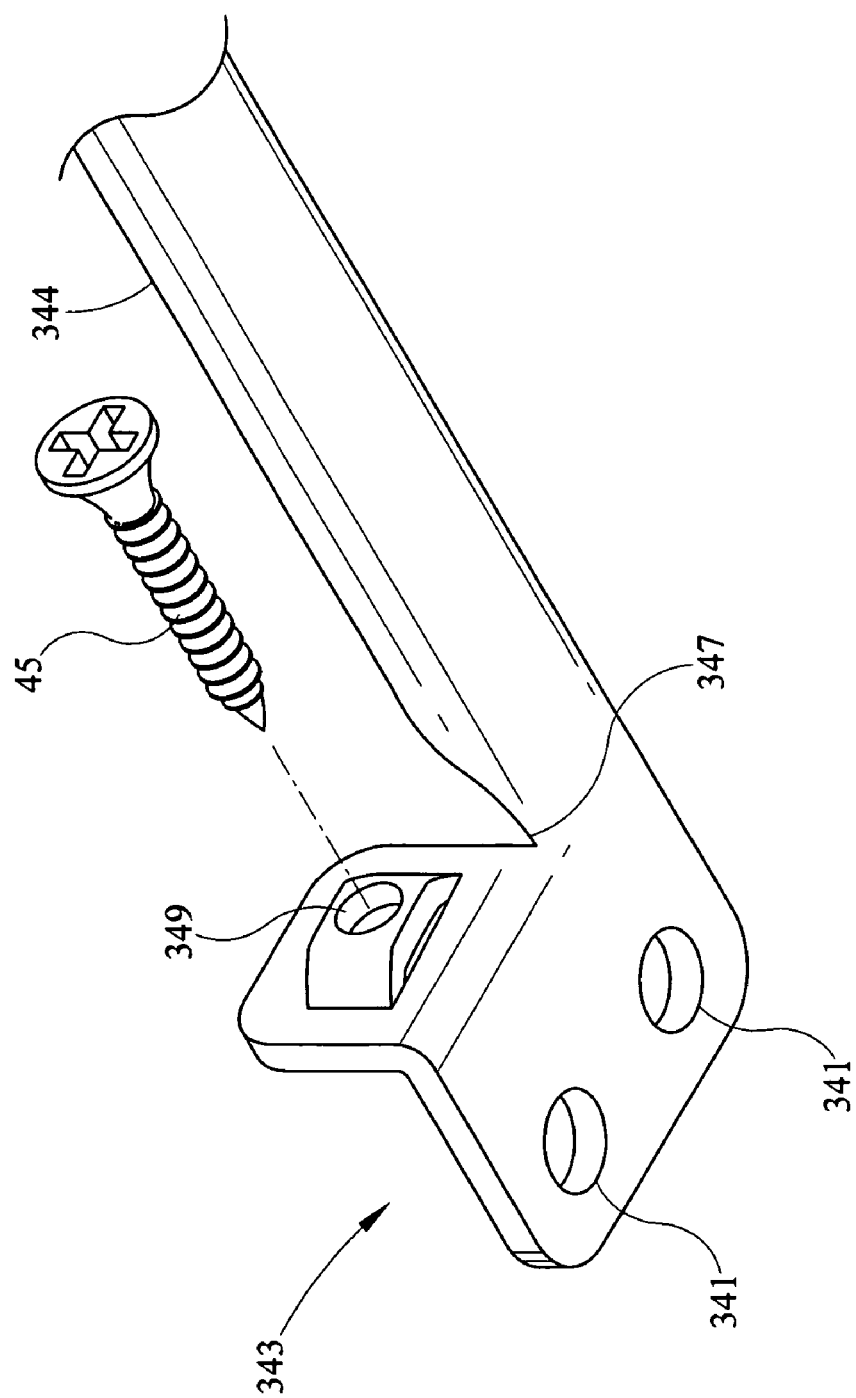
FIG. 10 is a perspective view of a hanger bar which connects to the lower edge of a ceiling support structure.

Referring now to FIG. 10, an alternative aspect of the present invention is depicted in perspective view. A foot 343 is shown connected to the first arm portion 344. The foot 343 may be connected along a bottom surface of a ceiling support structure such as a joist 12 (FIG. 1). The foot 343 is substantially L-shaped including a lower surface which engages the lower surface of the joist 12 through fastener apertures 341. Extending upwardly from the lower surface of foot 343 is a second leg having a fastening aperture 349 through which a fastener 45 may be disposed to engage a vertical surface of a ceiling support structure. Thus, the foot 343 may be positioned along a corner edge of joist 12 (FIG. 1) and connected to the ceiling joist along either a horizontal or vertical surface. The foot 343 is connected to the first arm portion 344 by a neck 347 where the first arm portion 344 may be bent relative to the foot 343 once the foot 343 is attached to a ceiling support structure such as the joist 12 (FIG. 1). Accordingly, the first arm portion 344 may be bent downwardly to install the junction box and wiring therein and subsequently bent upwardly, as depicted, to position the junction box and fixture frame (not shown) in an upward operating orientation between the joists 12, 13 (FIG. 1).

Figure 11:
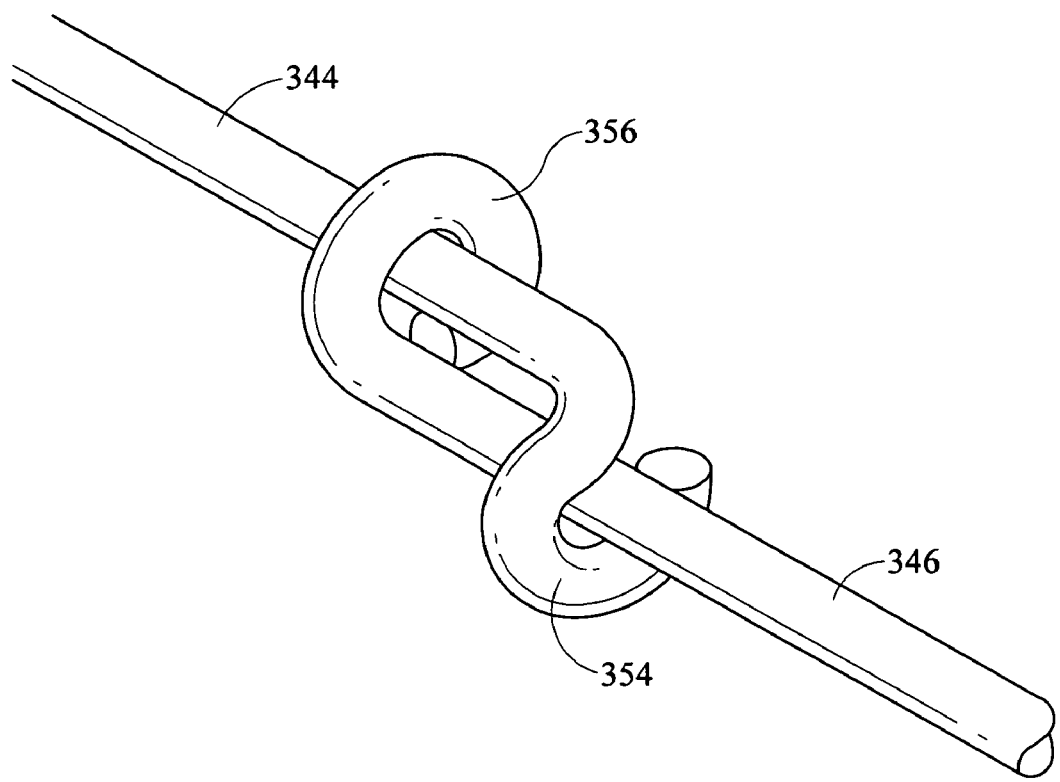
FIG. 11 is a perspective view of an alternative design for hanger bars which inhibits the hanger bars from detaching when disposed in a hanging position.

Referring now to FIG. 11, an alternative aspect is depicted in perspective view wherein the depicted structure limits the relative movement between portions of a hanger bar structure. The first arm portion 344 and second arm portion 346 are depicted as generally cylindrical in shape and are slidably connected by wire forms 354, 356 at ends of the arm portions 344,346. In the depicted configuration, when the first arm portion 344 is downwardly directed, for example during installation of the wiring in the junction box, the second wire form 356 engages the first wire form 354 so that the first and second arm portions 344,346 may not become detached as the entire structure hangs from the first ceiling support structure. Such structure may be utilized as an alternative to the tab and slot configuration of FIG. 8, which inhibits the fixture frame from falling while disposed in the hanging position from a single joist.

Figure 12:
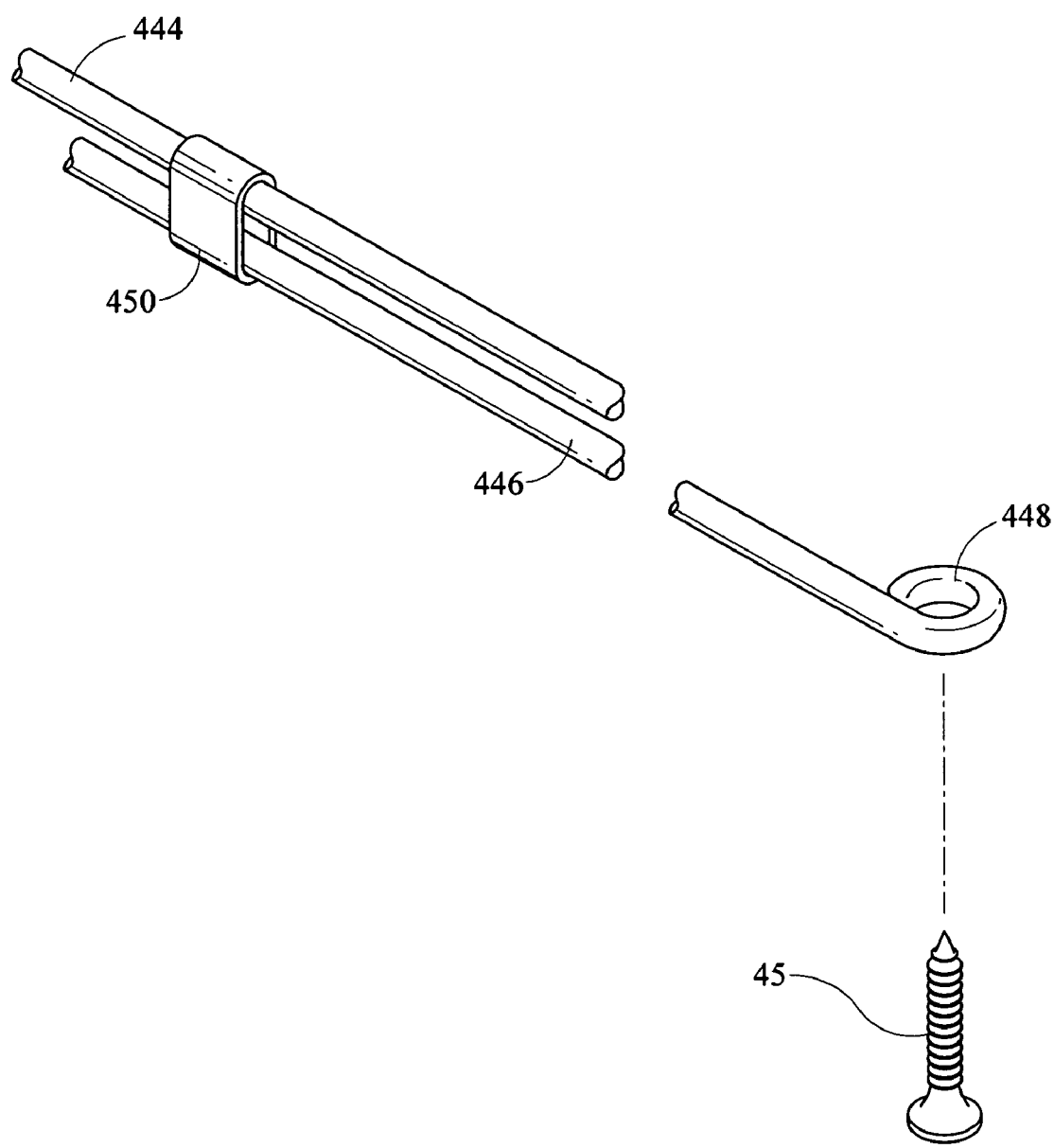
FIG. 12 is a perspective view of an alternative design for retaining the arms of the hanger bars together when disposed in a hanging position.

Referring now to FIG. 12, in yet a further alternative aspect which inhibits the fixture frame from falling while in the hanging position. According to the exemplary embodiment, a first arm portion 444 and second arm portion 446 are connected by a friction element 450. The friction element 450 inhibits sliding motion of the second arm portion 446 relative to the first arm portion 444. The first and second arm portions 444,446 may comprise various geometric cross-sections, such as square or circular shapes so long as the friction element is sized to receive such shape. The friction element 450 may be overcome by a user applying force to the first or second arm portions 444,446. Once the second arm portion 446 is adjusted to a proper length engage an adjacent ceiling support structure, such as a joist 13 (FIG. 1), a fastener 45 may be inserted through an eye 448 and into the joist.

Figure 13:
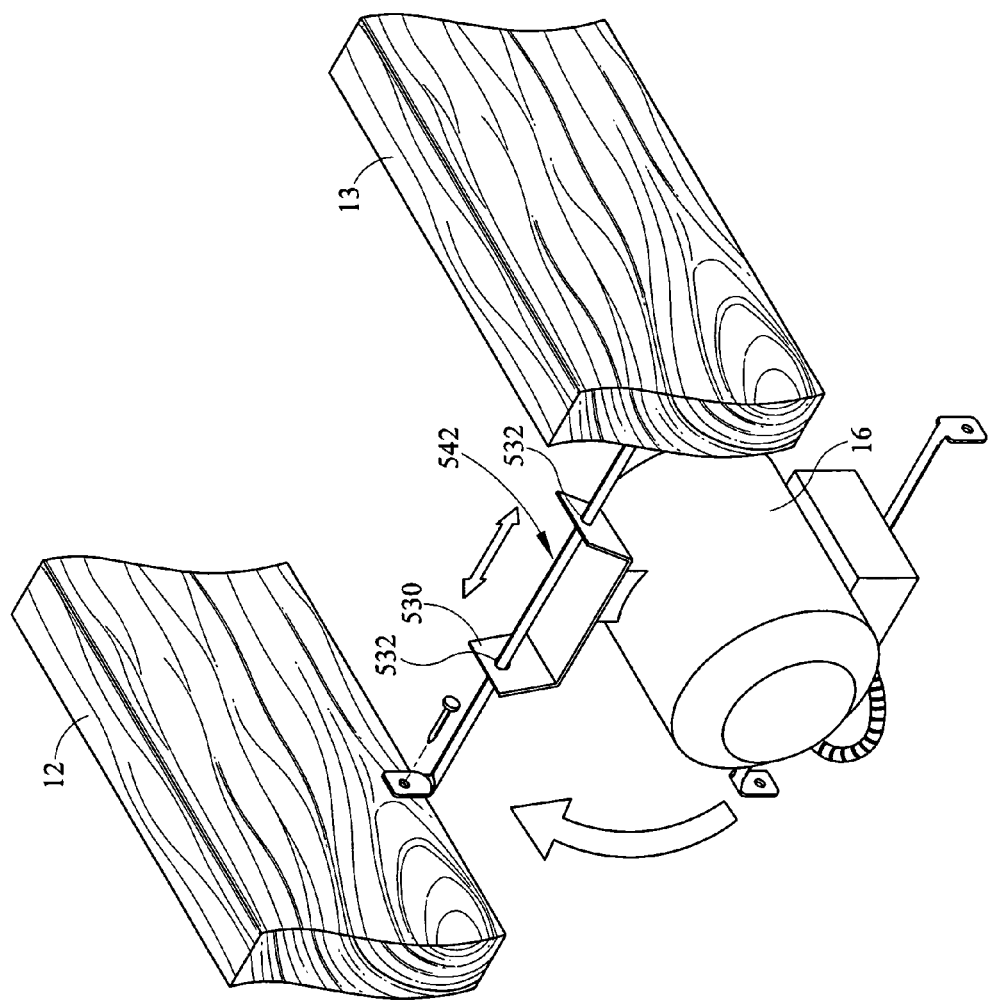
FIG. 13 is a perspective view of an alternative pivoting design for the fixture frame assembly.

Referring now to FIG. 13, an alternative aspect of the invention is depicted. A hanger bar 542 extending between first and second ceiling support structures, for example, joists 12, 13. A recessed lighting can 16 is moveable from an upward position to a downward position. As depicted, the can 16 depends from the hanger bar 542 and is oriented such that its longitudinal axis is parallel to the first and second joists 12, 13. The recessed can light 16 is connected to a substantially U-shaped bracket 530 having apertures 532 through which the bar 542 passes. As indicated in the Figure, apertures 532 are disposed in angled end portions of the bracket 530 so as to engage the hanger bar 542 passing therethrough. The can light 16 and junction box are connected to the bracket 530. The bracket 530 allows pivotal motion of the can light 16 about the hanger bar 542 and further allows sliding motion along the hanger bar 542. The pivotal motion is parallel to the joists 12,13. Alternatively stated, the axis of pivot of the can light 16 and junction box is perpendicular to the joists 12,13. In the exemplary embodiment, the hanger bar 542 defines the axis about which the junction box and can light 16 pivot. When the can 16 is pivoted to the downward position, the longitudinal axis of the can 16 is substantially parallel to the joists 12,13. Further, the bracket 530 may be squeezed at ends thereof above the apertures 532 in order to disengage the bracket 530 from the hanger bar 542 allowing sliding motion along the hanger bar 542 in directions parallel to the longitudinal axis of the hanger bar 542. The bracket 530 bites the bar 542 until the bracket is squeezed so that the apertures 532 are more axially aligned with the bar 542 rather than angled with respect to the major axis of bar 542 to allow the sliding motion.

Figure 14:
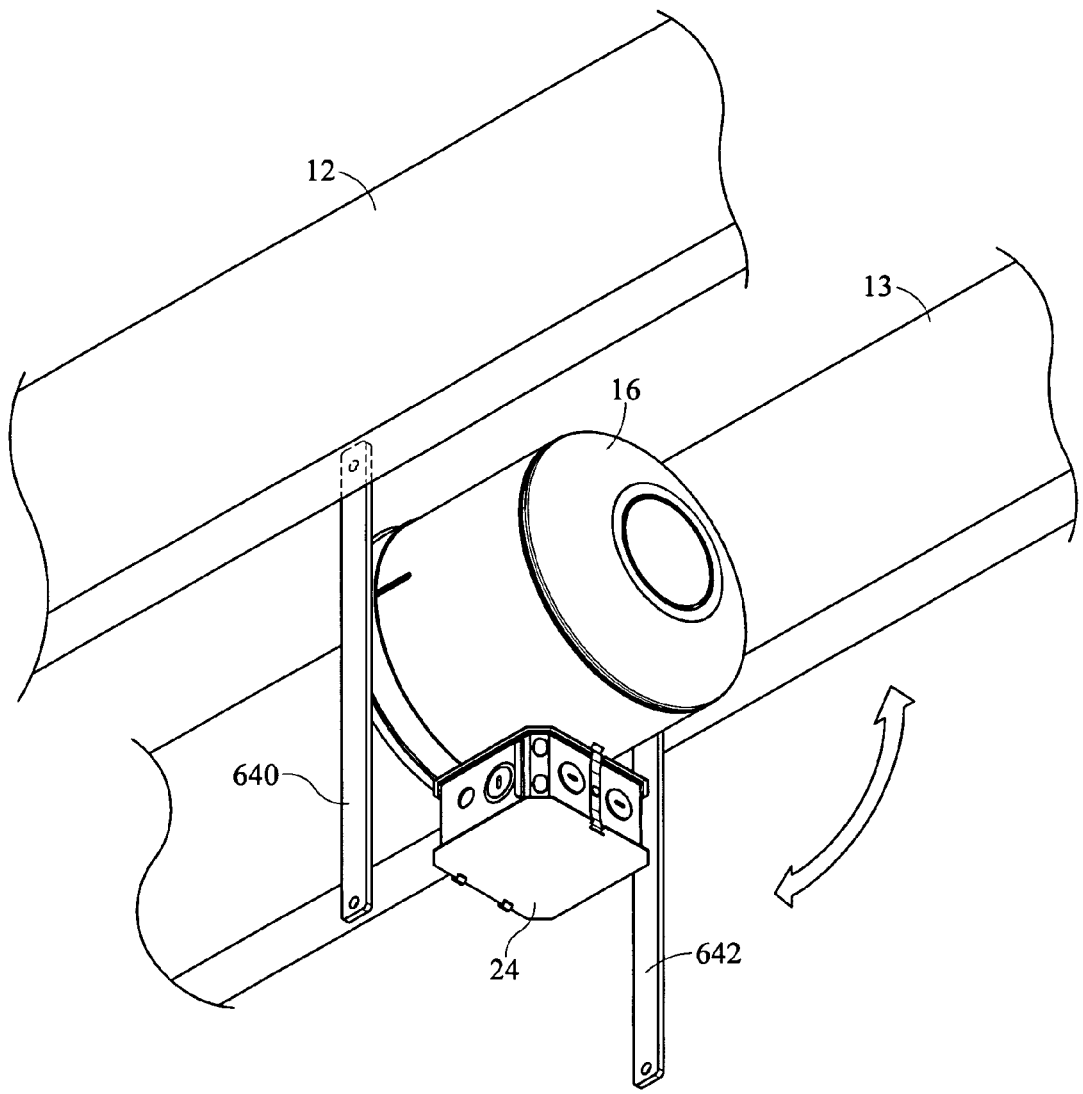
FIG. 14 is a perspective view of an alternative pivoting design for the fixture frame assembly.

Referring now to FIG. 14, an alternative aspect of the present invention is depicted. The first bar 640 and second bar 642 have a generally rectangular shape although various shapes may be utilized. The first bar 640 and second bar 642 are connected to a ceiling support structure 12 at two corresponding end positions. As depicted, the bars 640,642 are connected to ceiling support structures at single corresponding ends by fasteners or pivots and defining a pivot axis extending substantially perpendicularly to the bars 640, 642 and through the connection between the bars 640,642 and the ceiling support structures or joists 12,13. Suspended between the two bars 640,642 is a recessed can light 16. The recessed can 16 may be connected to the bars 640,642 by frame, arm, or directly connected and may further be adjustably mounted to compensate for varying distance between ceiling structures 12,13. When the first and second bars 640,642 are connected at corresponding ends to the support structures 12,13, the arms 640, 642 are pivoted downwardly so that the junction box 24 may be accessed for wiring installation. As depicted in the down position, the longitudinal axis of the recessed can light 16 is substantially parallel to the longitudinal axis of the ceiling support structures 12,13. The downward rotation of the junction box and recessed lighting can 16 allow for wiring installation beneath the ceiling support structure providing easy access and more room for an installer's hands and tools. Once the wiring installation is completed within the junction box 24, the second end of the bars 640,642 are raised and connected to the support structures 12,13. By rotating the second ends of the bars 640, 642, the junction box 24 and recessed lighting can 16 move upwardly within the space into a vertical orientation between the ceiling support structures 12,13. As the can 16 is rotated from its position with the longitudinal axis extending parallel to the ceiling support structures 12, 13 to an upper position wherein the longitudinal axis of the can 16 is substantially perpendicular to the longitudinal direction the first and second ceiling support structures 12, 13, the second ends of the bars 604,642 may be connected to the structures 12,13 and drywall or suspended ceiling installation may proceed to enclose the recessed luminaire fixture.

Figure 15:
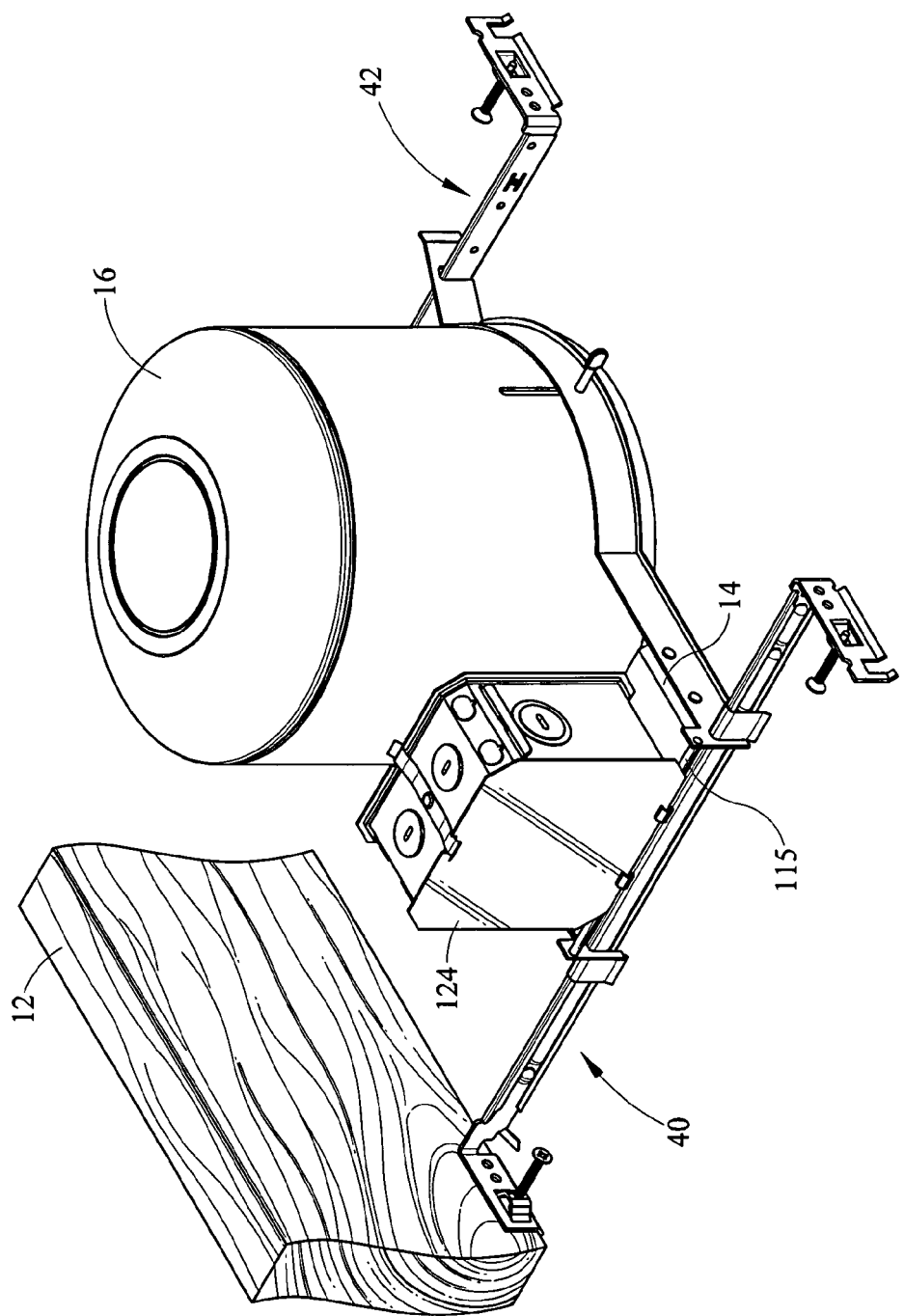
FIGS. 15-17 are perspective views of an alternative structure which pivots a junction box mounted to the fixture frame.
Figure 16:
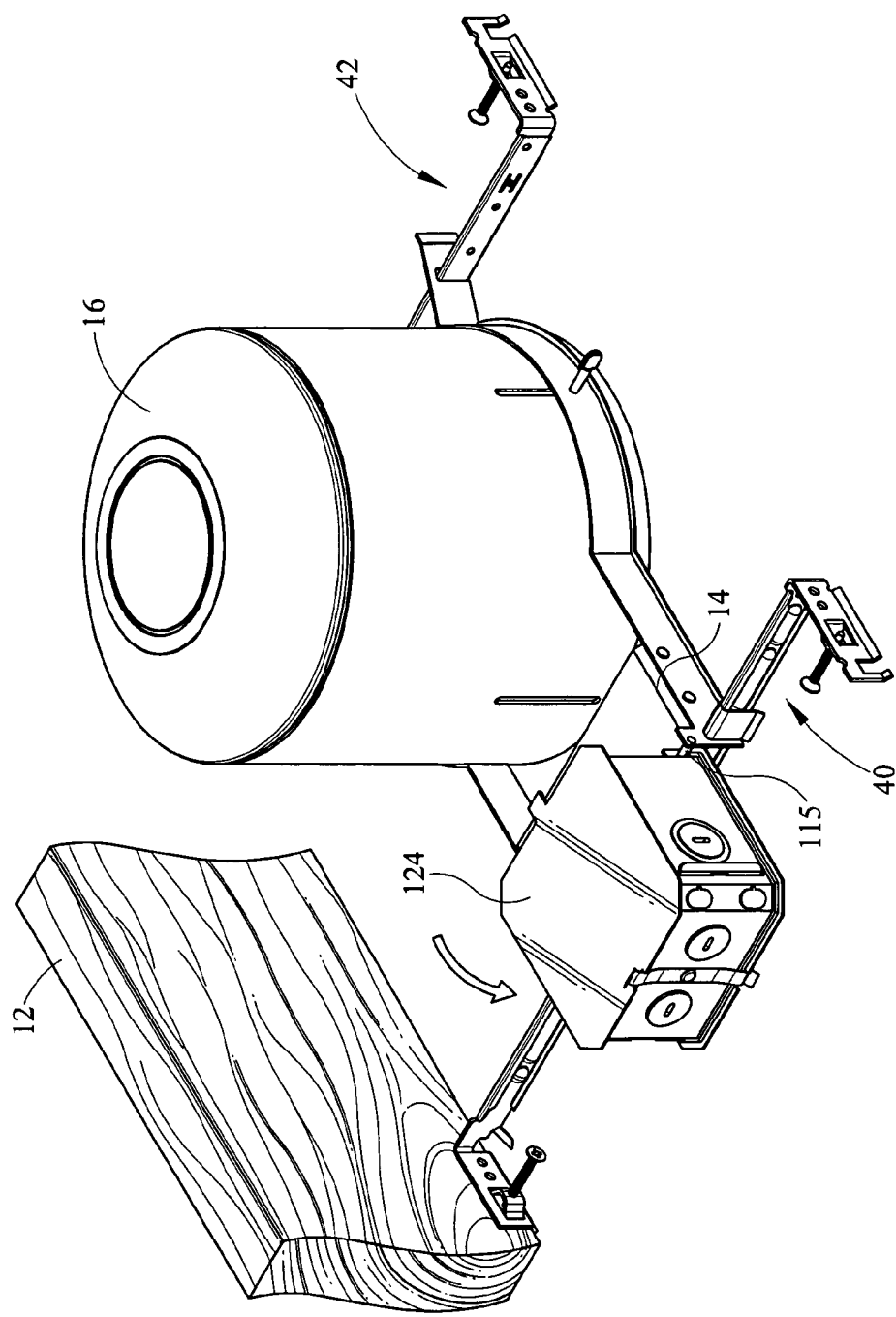
Figure 17:
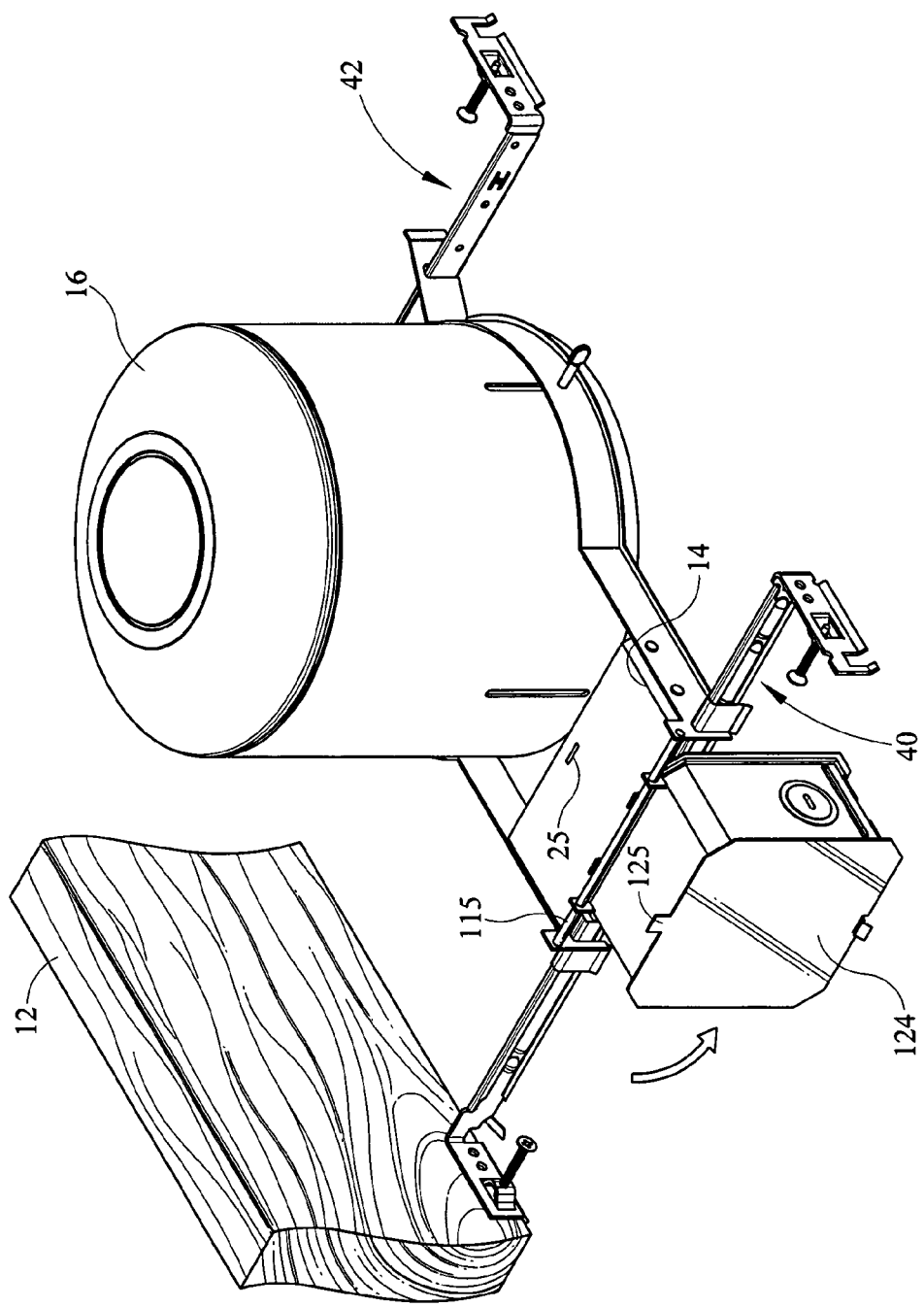

Referring now to FIGS. 15-17, an alternative aspect of the present invention is depicted wherein the junction box 124 is pivotally connected to the fixture frame for movement of the junction box between a first upper installed position and a second downward installation position wherein at least a portion of the junction box is positioned beneath the fixture frame.

Referring first to FIG. 15, the recessed downlight assembly comprises a first bar 40 and a second bar 42. Extending between the first bar 40 and second bar 42 is a fixture frame 14 which receives the recessed lighting can 16 therebetween.

Along an upper surface of the fixture frame 14 is a junction box 124 wherein wiring installation may be completed and enclosed. The first and second bars 40, 42 are connected to first and second ceiling support structures, one of the ceiling support structures 12 is depicted. The junction box 124 is pivotally connected to the fixture frame 14 by a shaft 115 extending through a lower portion of the junction box 14. The shaft 155 may extend directly through elements defining the junction box 124 or indirectly, for example by parts connecting the shaft 115 and junction box 124. In either event, the junction box 124 pivots about the shaft 115. As shown in FIG. 16, the junction box 124 is disposed in a horizontal position between the first upper position and the second lower position. As shown in FIG. 17, the junction box 124 is disposed in the downward position for wiring installation. The fixture frame 14 may further comprise a receiving portion 25, such as a slot, for receiving a tab 125 depending from the junction box 124. The tab 125 and slot 25 may help stabilize the junction box 124 in an upright position as shown in FIG. 15. From the downward position of FIG. 17, the junction box door may be removed and wiring connections may be made within the junction box 124 and through knockouts in the sidewalls of the junction box 124. Upon completion of the wiring, the junction box 124 is returned to its position depicted in FIG. 15. Additionally, the frame 14 may be moved laterally along the hanger bars 40,42 between the parallel joists 12,13 (not shown).

Figure 18:
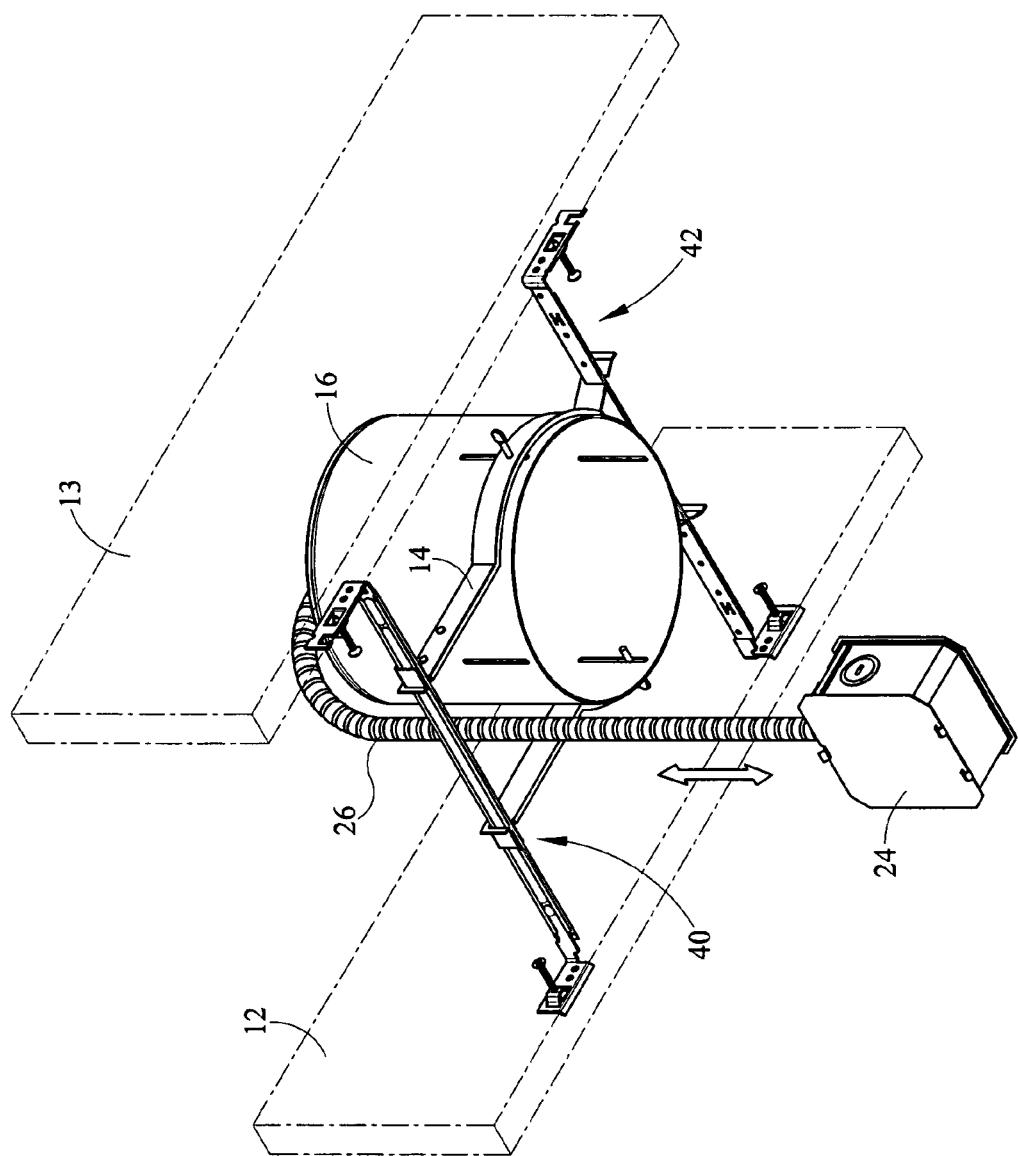
FIG. 18 is a perspective view of a moveable junction box.

Referring now to FIG. 18, an alternative aspect of the allowing wiring completion below the ceiling support structures. The Figure depicts a junction box 24 connected by a conduit 26 to a recessed can light 16. The aforementioned structures are suspended between first and second ceiling structures 12, 13 by a first bar 40 and a second bar 42. The conduit 26 has a length which allows the junction box 24 to hang downwardly beneath the level of the first and second ceiling support members 12, 13. Therefore, during installation, the junction box 24 may be removed from the fixture frame 14 and disposed in a lowermost position beneath the ceiling structure to allow for ease of installation of wiring within the junction box 24. Upon completion of the wiring installation within the junction box, the junction box 24 may be disposed in an upward position on the fixture frame 14 or connected to the recessed lighting can 16.

Figure 19:
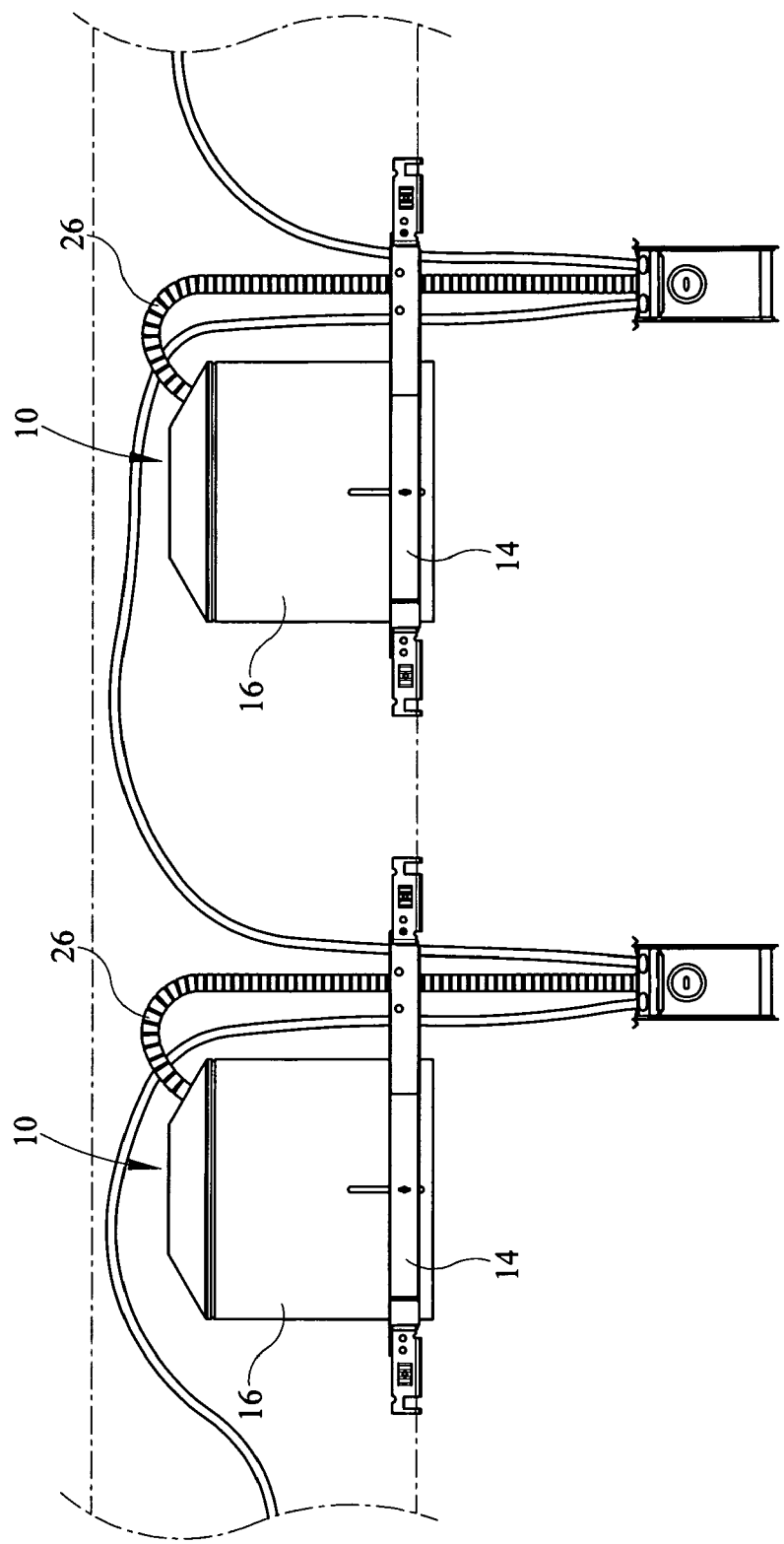
FIG. 19 is a side view of multiple lights mounted and connected in the manner depicted in FIG. 18.

Referring to FIG. 19, a plurality of recessed lighting assemblies 10 are shown with the conduit design of FIG. 18 such that the junction box may be disposed below the ceiling support structures 12, 13 allowing for ease of wiring installation prior to positioning of the junction box upwardly to the fixture frame 14.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A recessed fixture frame mounting device for being suspended between two support structures, the device comprising:
   one or more hanger bars having two ends, with one end movably connected to one of the two support structures, each end comprising an arm, a foot, and a neck, wherein the neck fixedly connects the arm and the foot, and wherein the neck is configured to deform to allow bending of the end at the neck; and
   a can light and a junction box connected to said one or more hanger bars;
   wherein said can light and said junction box are movable about the one or more hanger bars,
   wherein the one or more hanger bars are configured to position the junction box beneath the two support structures to allow easy installation of wiring and to further reposition the junction box between the two support structures, and
   wherein the neck of the one end comprises a spring for deforming in a direction different from a direction of a longitudinal axis of the spring to move said can light and said junction box beneath the two support structures.

2. The recessed fixture frame mounting device of claim 1, further comprising a bracket having an aperture, wherein said bracket is affixed to the can light and is slidably connected to one of the hanger bars.

3. The recessed fixture frame mounting device of claim 2, wherein each hanger bar is connected to one of said two support structures.

4. The recessed fixture frame mounting device of claim 1, wherein said one or more hanger bars extend perpendicular to said two support structures.

5. The recessed fixture frame mounting device of claim 1 wherein said first and second hanger bars pivot from different joists.

6. The recessed fixture frame mounting device of claim 1, wherein said two support structures and said one or more hanger bars individually include upper and lower surfaces and two opposite edge surfaces.

7. The recessed fixture frame mounting device of claim 6, wherein said edge surfaces of each hanger bar are substantially parallel to the edge surfaces of the two support structures.

8. The recessed fixture frame mounting device of claim 1, wherein said two support structures include suspended ceiling bars.

9. The recessed fixture frame mounting device of claim 1 wherein said first hanger bar and said second hanger bar extend parallel to said first joist and said second joist.

10. The recessed fixture frame mounting device of claim 5, said first hanger bar having first and second ends connected to said first joist and said second hanger bar having first and second ends connected to said second joist.

11. The recessed fixture frame mounting device of claim 1, wherein the one or more hanger bars comprises two hanger bars.

* * * * *